US011972743B2

United States Patent
Kumamoto et al.

(10) Patent No.: US 11,972,743 B2
(45) Date of Patent: *Apr. 30, 2024

(54) DEVICE AND METHOD FOR DRIVING A DISPLAY PANEL

(71) Applicant: Synaptics Incorporated, San Jose, CA (US)

(72) Inventors: Akihito Kumamoto, Tokyo (JP); Keiichi Hirano, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,305

(22) Filed: Mar. 8, 2023

(65) Prior Publication Data

US 2023/0237977 A1    Jul. 27, 2023

Related U.S. Application Data

(63) Continuation of application No. 17/313,176, filed on May 6, 2021, now Pat. No. 11,657,784, which is a
(Continued)

(51) Int. Cl.
*G09G 5/377* (2006.01)
*G09G 3/20* (2006.01)
*G09G 5/393* (2006.01)

(52) U.S. Cl.
CPC ............... *G09G 5/377* (2013.01); *G09G 3/20* (2013.01); *G09G 5/393* (2013.01);
(Continued)

(58) Field of Classification Search
CPC ....... G06F 3/04184; G06F 2203/04108; G06F 2203/04112; G06F 3/03547; G06F 3/0412; G06F 3/04166; G06F 3/041662; G06F 3/044; G06F 3/0443; G02F 1/13338; G09G 3/20; H02M 1/44; H02M 3/07; H02M 3/156
See application file for complete search history.

(56) References Cited

U.S. PATENT DOCUMENTS 9,894,330 B2 *  2/2018  Tomita ................. H04N 9/3138
2015/0246613 A1 *  9/2015  Shimazu ................ B60K 35/00
                                                          340/439
(Continued)

*Primary Examiner* — Ming Wu
(74) *Attorney, Agent, or Firm* — Leydig, Voit & Mayer, Ltd.

(57) ABSTRACT

A processing system comprises a first integrated circuit (IC) and a second IC. The first IC comprises first image processing circuitry, first display panel driver circuitry, and first communication circuitry. The first image processing circuitry is configured to generate a first overlay image by overlaying a first partial input image with a first image element based on first partial input image data representing the first partial input image and first image element data representing the first image element. The first display panel driver circuitry is configured to drive a display panel based on the first overlay image. The first communication circuitry is configured to output second image element data representing a second image element to the second IC.

20 Claims, 11 Drawing Sheets

Related U.S. Application Data continuation of application No. 16/778,627, filed on Jan. 31, 2020, now Pat. No. 11,030,977.

(60) Provisional application No. 62/915,001, filed on Oct. 14, 2019.

(52) U.S. Cl.
CPC ..... *G09G 2330/12* (2013.01); *G09G 2340/12* (2013.01); *G09G 2370/00* (2013.01); *G09G 2380/10* (2013.01)

(56) References Cited

U.S. PATENT DOCUMENTS

| | | | |
|---|---|---|---|
| 2018/0060013 A1* | 3/2018 | Son | G06F 3/1446 |
| 2018/0293934 A1* | 10/2018 | Huang | G09G 3/32 |
| 2018/0295303 A1* | 10/2018 | Murao | H01L 27/14612 |

* cited by examiner

DEVICE AND METHOD FOR DRIVING A DISPLAY PANEL

CROSS-REFERENCE TO RELATED APPLICATIONS

This application claims priority U.S. patent application Ser. No. 17/313,176, filed on May 6, 2021, which claims priority to U.S. patent application Ser. No. 16/778,627, filed on Jan. 31, 2020, now U.S. Pat. No. 11,030,977, and claims the benefit of U.S. provisional patent application Ser. No. 62/915,001, filed on Oct. 14, 2019, which applications are incorporated by reference herein in their entirety.

BACKGROUND

Field

Embodiments disclosed herein generally relate to electronic devices, and more specifically, to devices for driving a display panel.

Description of the Related Art

A processing system configured to drive a display panel such as an organic light emitting diode (OLED) panel or a liquid crystal panel may include a plurality of integrated circuit (IC) chips.

SUMMARY

This summary is provided to introduce in a simplified form a selection of concepts that are further described below in the Detailed Description. This summary is not intended to identify key features or essential features of the claimed subject matter, nor is it intended to limit the scope of the claimed subject matter.

A processing system is disclosed. In one or more embodiments, the processing system comprises a first IC chip and a second IC chip. The first IC chip comprises first image processing circuitry, first display panel driver circuitry, and first communication circuitry. The first image processing circuitry is configured to generate a first overlay image by overlaying a first partial input image with a first image element based on first partial input image data representing the first partial input image and first image element data representing the first image element. The first display panel driver circuitry is configured to drive a display panel based on the first overlay image. The first communication circuitry is configured to output second image element data representing a second image element to the second IC chip.

In one or more embodiments, an IC chip is disclosed. The IC chip comprises image processing circuitry, display panel driver circuitry, and communication circuitry. The image processing circuitry is configured to generate an overlay image by overlaying a partial input image with a first image element based on partial input image data representing the partial input image and first image element data representing the first image element. The display panel driver circuitry is configured to drive a display panel based on the overlay image. The communication circuitry is configured to output second image element data representing a second image element to a first IC chip in a first operation mode and receive the first image element data from a second IC chip.

A method for driving a display panel is also disclosed. In one or more embodiments, the method comprises generating, by the first IC chip, a first overlay image including a first partial input image overlaid with a first image element and driving, by the first IC chip, a display panel using the first overlay image. The method further comprises outputting, by the first IC chip to a second IC chip, second image element data representing a second image element. The method further comprises generating, by the second IC chip, a second overlay image including a second partial input image overlaid with the second image element and driving the display panel using the second overlay image by the second IC chip.

BRIEF DESCRIPTION OF THE DRAWINGS

So that the manner in which the above recited features of the present disclosure may be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

Figure 1:
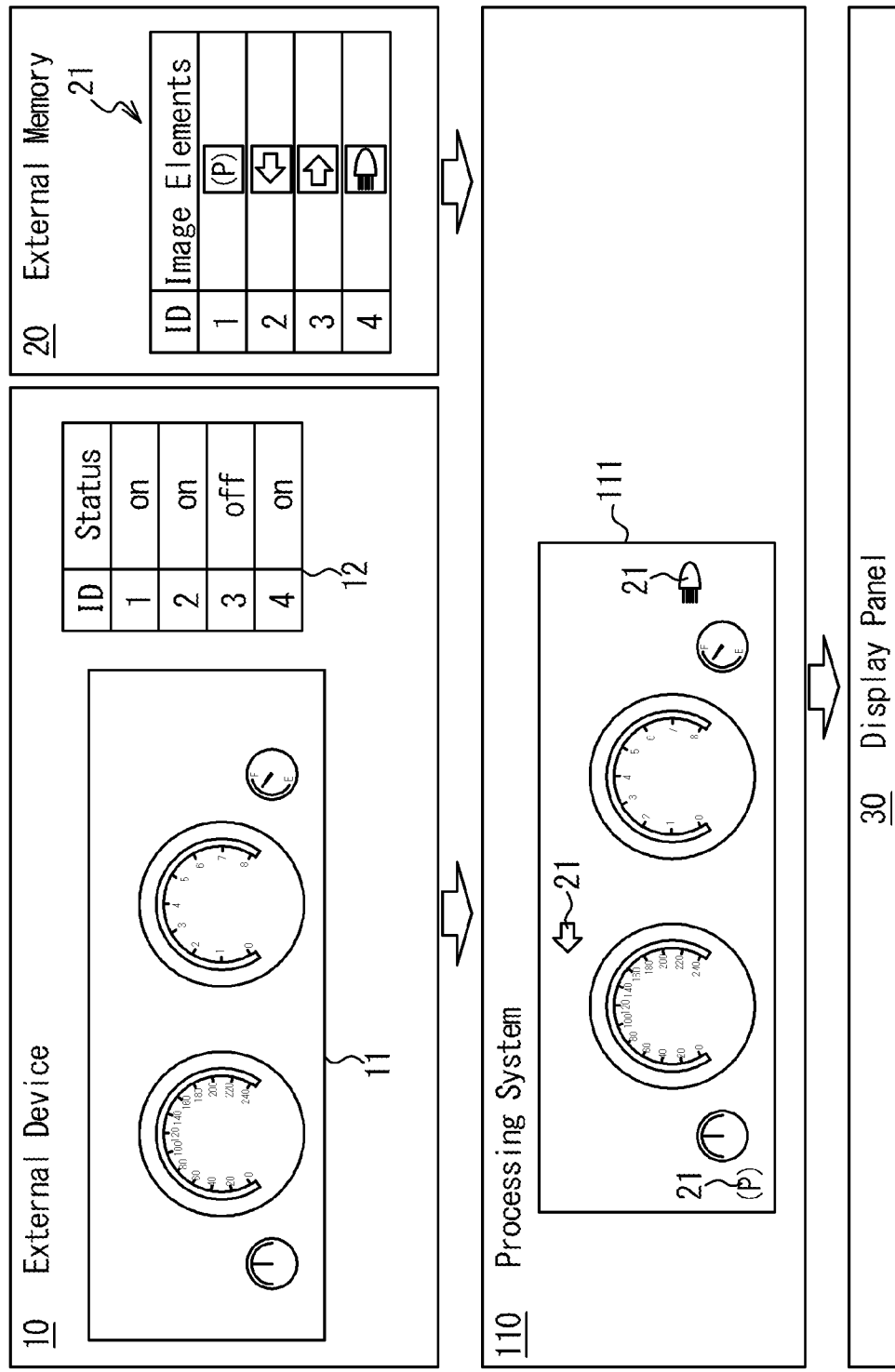
FIG. 1 illustrates an example configuration of a display device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

A processing system configured to drive a display panel may comprise a plurality of integrated circuits (ICs) also referred to as IC chips. Synchronization among these IC chips can improve efficiency of such systems.

FIG. 1 illustrates an example configuration of a display system, according to one or more embodiments. In the embodiment illustrated, a processing system 110 is configured to drive a display panel 30 based on an input image 11 and one or more image elements 21, which may each comprise an icon, to display a desired image. An external device 10 disposed outside of the processing system 110 may supply input image data representing the input image 11 to the processing system 110, and an external memory 20 may supply image element data representing the image elements 21 to the processing system 110. In one or more embodiments, the external device 10 is configured to output, to the processing system 110, overlay control information 12 indicating whether each of the image elements 21 is to be displayed. In such embodiments, the processing system 110 may be configured to generate, based on the overlay control information 12, an overlay image 111 in which the input image 11 is overlaid with at least one image element 21 specified by the overlay control information 12 at a desired location. The generated overlay image 111 may be displayed on the display panel 30.

Figure 2:
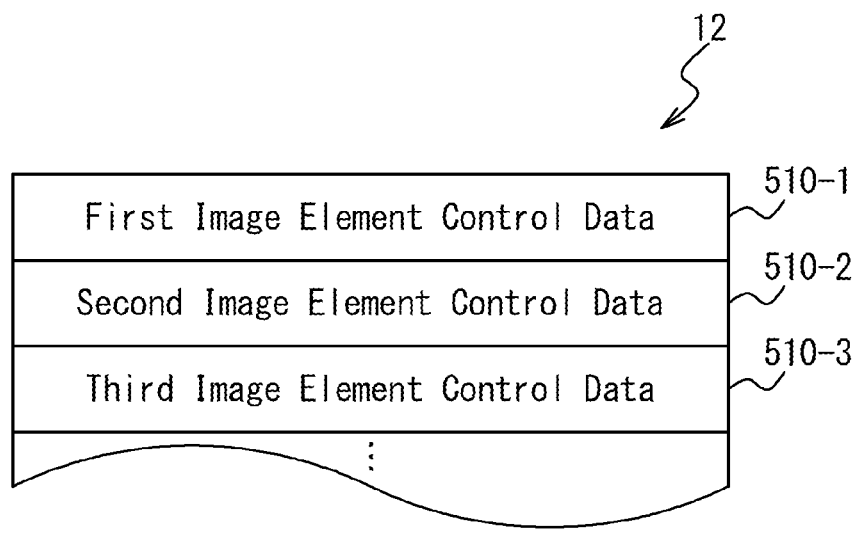
FIG. 2 illustrates an example structure of overlay control information, according to one or more embodiments.

FIG. 2 illustrates example contents of the overlay control information 12. In the embodiment illustrated, the overlay control information 12 includes first to third image element control data 510-1 to 510-3. The first to third image element control data 510-1 to 510-3 indicate whether the input image 11 is to be overlaid with first to third image elements among the image elements 21, respectively. For example, the first image element control data 510-1 may comprise an identifier to identify the first image element and a status value that indicates whether the input image 11 is to be overlaid with first image element. The second and third image element control data 510-2 to 510-3 may be configured similar to the first image element control data 510-1.

Figure 3:
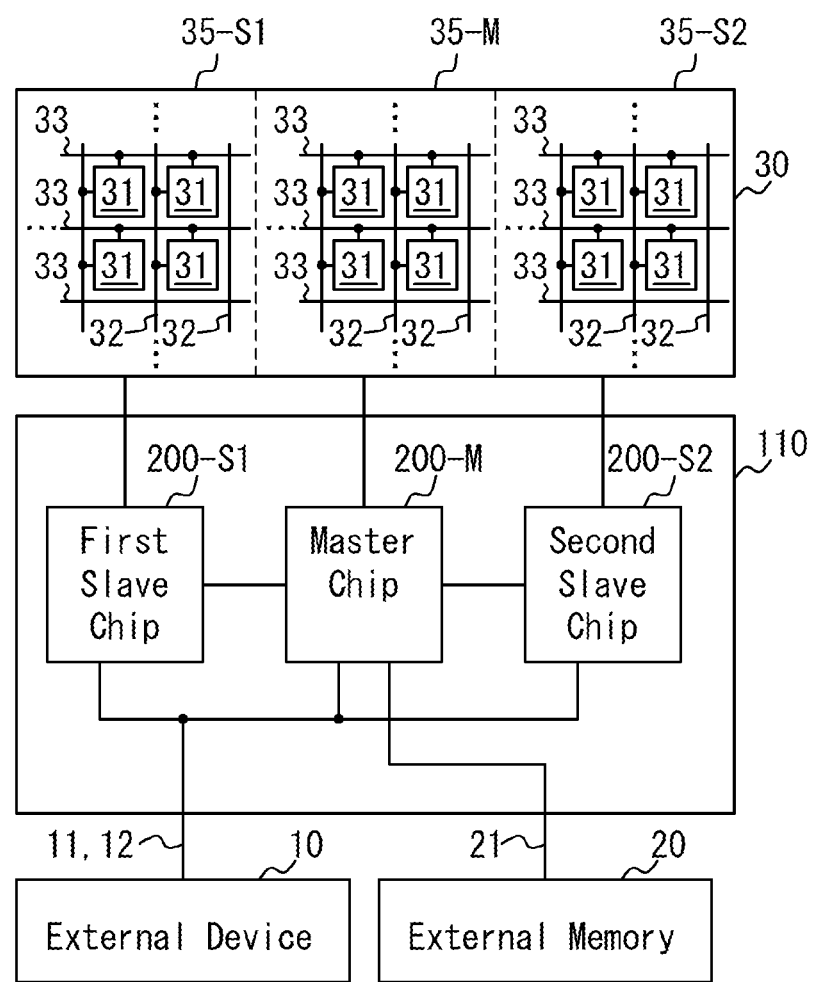
FIG. 3 illustrates an example configuration of a display device, according to one or more embodiments.

FIG. 3 illustrates example configurations of the display panel 30 and the processing system 110, according to one or more embodiments. In the embodiment illustrated, the display panel 30 includes pixel circuits 31, source lines 32, and gate lines 33. The source lines 32 are connected to the processing system 110 and the gate lines 33 are connected to gate driver circuitry (not illustrated) configured to select the gate lines 33. Each pixel circuit 31 is connected to a corresponding source line 32 and gate line 33. The pixel circuits 31 are driven based on inputs to the source lines 32 and selection of the gate lines 33. Examples of the display panel 30 include an organic light emitting diode (OLED) display panel, a liquid crystal display (LCD) panel, or the like. The display panel 30 may be mounted in, but not limited to, a motor vehicle.

In one or more embodiments, the processing system 110 comprises a plurality of IC chips 200, including, for example, a master chip 200-M, a first slave chip 200-S1 and a second slave chip 200-S2. In the embodiment shown, the display panel 30 is segmented into a number of partial areas 35, each corresponding to an IC chip 200 which may be configured to drive pixel circuits 31 in the corresponding partial area 35. The partial areas 35 may be segmented depending on the number of source lines 32 each IC chip 200 can drive. The partial areas 35 may be defined to incorporate the same number of source lines 32, but not limited to this. The partial areas 35 may be segmented with boundaries parallel to the direction in which the source lines 32 of the display panel 30 extend. For example, the master chip 200-M may drive pixel circuits 31 in a partial area 35-M; the first slave chip 200-S1 may drive pixel circuits 31 in a partial area 35-S1; and the second slave chip 200-S2 may drive pixel circuits 31 in a partial area 35-S2. Each IC chip 200 may control inputs to the associated source lines 32 and at least one of the IC chips 200 may control selection of the gate lines 33. In embodiments where the display panel 30 comprises sensor electrodes for detecting a contact or approach of an input object to the display panel 30, the processing system 110 may be configured to detect, based on signals from the sensor electrodes, a location of the input object.

In one or more embodiments, the external device 10 is configured to output the overlay control information 12 and the input image data representing the input image 11 to each IC chip 200. In such embodiments, each IC chip 200 may be configured to extract, from the input image data, partial input image data corresponding to the partial area 35 to which the IC chip 200 is assigned and drive the display panel 30 based on the extracted partial input image data. The input image data may describe grayscale values of respective colors (e.g., red, green, and blue) of each pixel included in the input image 11.

In one or more embodiments, the external memory 20 is configured to output the image element data representing the image elements 21 to at least one of the IC chips 200. For example, the external memory 20 may be configured to output all of the image elements 21 to the master chip 200-M, output a subset of image elements 21 to selected IC chips 200, etc. The image element data may include grayscale values of the respective colors of each pixel included in the image elements 21. In other embodiments, the master chip 200-M may comprise an internal memory that stores the image element data.

Figure 4:
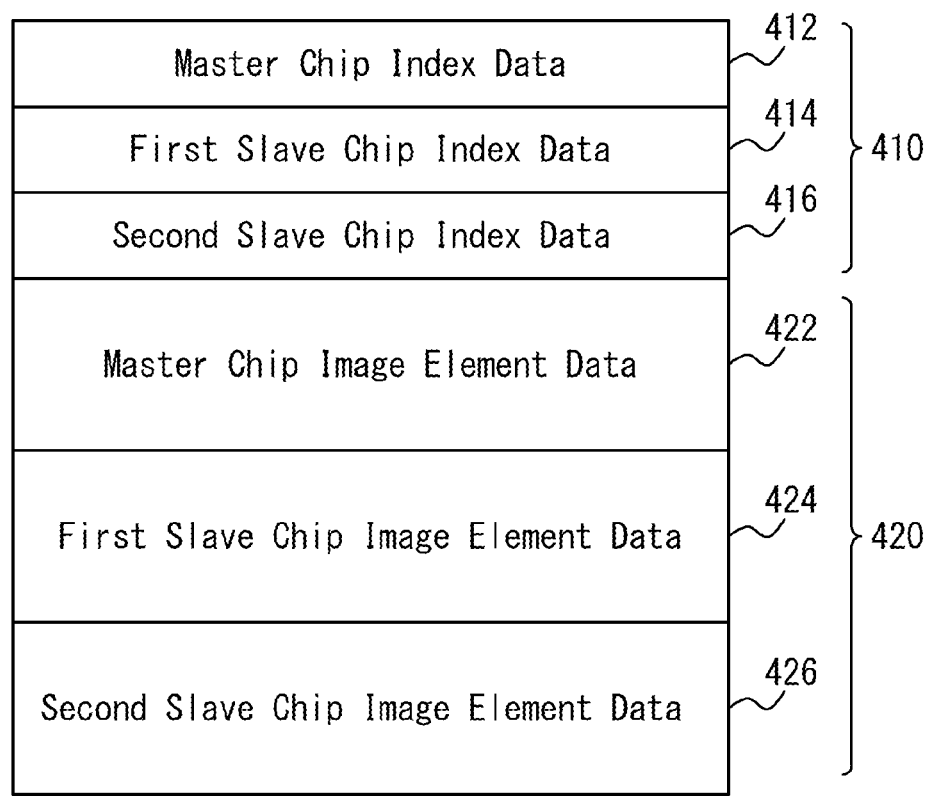
FIG. 4 illustrates example data stored in an external memory, according to one or more embodiments.

FIG. 4 illustrates example data stored in the external memory 20, according to one or more embodiments. In the embodiment illustrated, the external memory 20 is configured to store image element data 420 representing the image elements 21 and index data 410 comprising attribute information of each image element 21. The attribute information of each image element 21 indicates, for example, the data size of the corresponding image element data 420 and the location at which the image element 21 is to be displayed. The master chip 200-M may be configured to receive the index data 410 from the external memory 20 and transfer the image element data 420 to another IC chip 200 based on the index data 410.

In one or more embodiments, the index data 410 comprises master chip index data 412, first slave chip index data 414, and second slave chip index data 416. The master chip index data 412 may comprise attribute information of each image element 21 to be displayed in the partial area 35-M assigned to the master chip 200-M. The first slave chip index data 414 may comprise attribute information of each image element 21 to be displayed in the partial area 35-S1 assigned to the first slave chip 200-S1. The second slave chip index data 416 may comprise attribute information of each image element 21 to be displayed in the partial area 35-S2 assigned to the second slave chip 200-S2.

In one or more embodiments, the image element data 420 comprises master chip image element data 422, first slave chip image element data 424, and second slave chip image element data 426. The master chip image element data 422 may comprise image element data representing each image element 21 to be displayed on the partial area 35-M assigned to the master chip 200-M. The first slave chip image element data 424 may comprise image element data representing each image element 21 to be displayed on the partial area 35-S1 assigned to the first slave chip 200-S1. The second slave chip image element data 426 may comprise image element data representing each image element 21 to be displayed in the partial area 35-S2 assigned to the second slave chip 200-S2.

Figure 5:
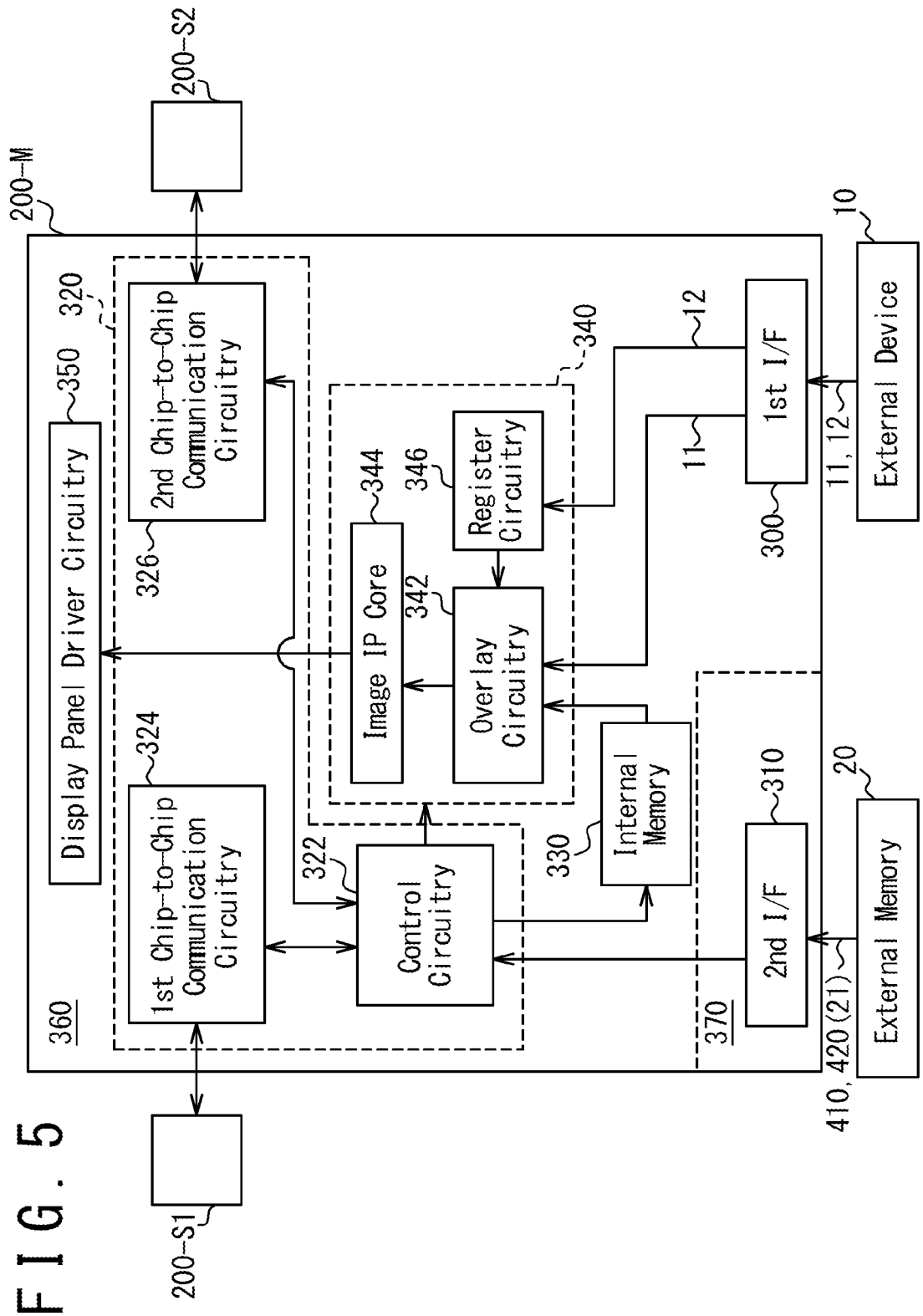
FIG. 5 illustrates an example configuration of a processing system, according to one or more embodiments.

FIG. 5 illustrates an example configuration of the master chip 220-M, according to one or more embodiments. In the embodiment illustrated, the master chip 200-M comprises a first interface (I/F) 300, a second interface (I/F) 310, communication circuitry 320, an internal memory 330, image processing circuitry 340, and display panel driver circuitry 350. In one or more embodiments, the first slave chip 200-S1 and the second slave chip 200-S2 have the same configuration as that of the master chip 200-M. In other embodiments, the first slave chip 200-S1 and the second slave chip 200-S2 may have different configurations from that of the master chip 200-M.

In one or more embodiments, the first interface 300 is configured to transfer, from the external device 10 to the image processing circuitry 340, the input image data representing the input image 11 and the overlay control information 12. In other embodiments, the first interface 300 may be configured to extract, from the input image data, partial input image data representing a partial input image that corresponds to the partial area 35-M to which the master chip 200-M is assigned and output the extracted partial input image data to the image processing circuitry 340. The first interface 300 may comprise a low voltage differential signaling (LVDS) interface, a serial peripheral interface (SPI), an inter-integrated circuit (I2C) interface, or another suitable interface. The LVDS interface may be configured to receive the input image data from the external device 10. The first interface 300 may comprise a plurality of LVDS interfaces, for example, two LVDS interfaces, configured to receive the input image data from the external device 10 and a SPI or I2C interface configured to receive the overlay control information 12.

In one or more embodiments, the second interface 310 of the master chip 220-M is configured to transfer, at startup of the processing system 110, the index data 410 and the image element data 420 from the external memory 20 to the communication circuitry 320. The second interface 310 may comprise a SPI, an I2C, or another suitable interface or a combination of these interfaces. In embodiments where the first slave chip 200-S1 and the second slave chip 200-S2 have the same configuration as that of the master chip 200-M, the first slave chip 200-S1 and the second slave chip 200-S2 may also comprise the second interface 310. In such embodiments, the second interface 310 of the first slave chip 200-S1 and the second interface 310 of the second slave chip 200-S2 may be deactivated and disconnected from the external memory 20.

In one or more embodiments, the communication circuitry 320 comprises control circuitry 322, first chip-to-chip communication circuitry 324, and second chip-to-chip communication circuitry 326. The control circuitry 322 is configured to transfer the index data 410 and the image element data 420 from the second interface 310 to the internal memory 330. The control circuitry 322 may be configured to transfer only the index data 410 and the image element data 420 associated with image elements 21 to be displayed on the partial area 35 assigned to the master chip 200-M. In other embodiments, the control circuitry 322 may be configured to transfer the index data 410 and the image element data 420 associated with all the image elements 21.

The control circuitry 322 may be further configured to control chip-to-chip communications between the communication circuitry 320 and one or more different IC chips 200, which may be an adjacent IC chip 200. In one or more embodiments, the different IC chips 200 may include the first slave chip 200-S1 and the second slave chip 200-S2. The chip-to-chip communications with a different IC chip 200 may be used to transfer the image element data. Additionally, or alternatively, the chip-to-chip communications may be used to synchronize image processing in the IC chips 200.

Figure 7:
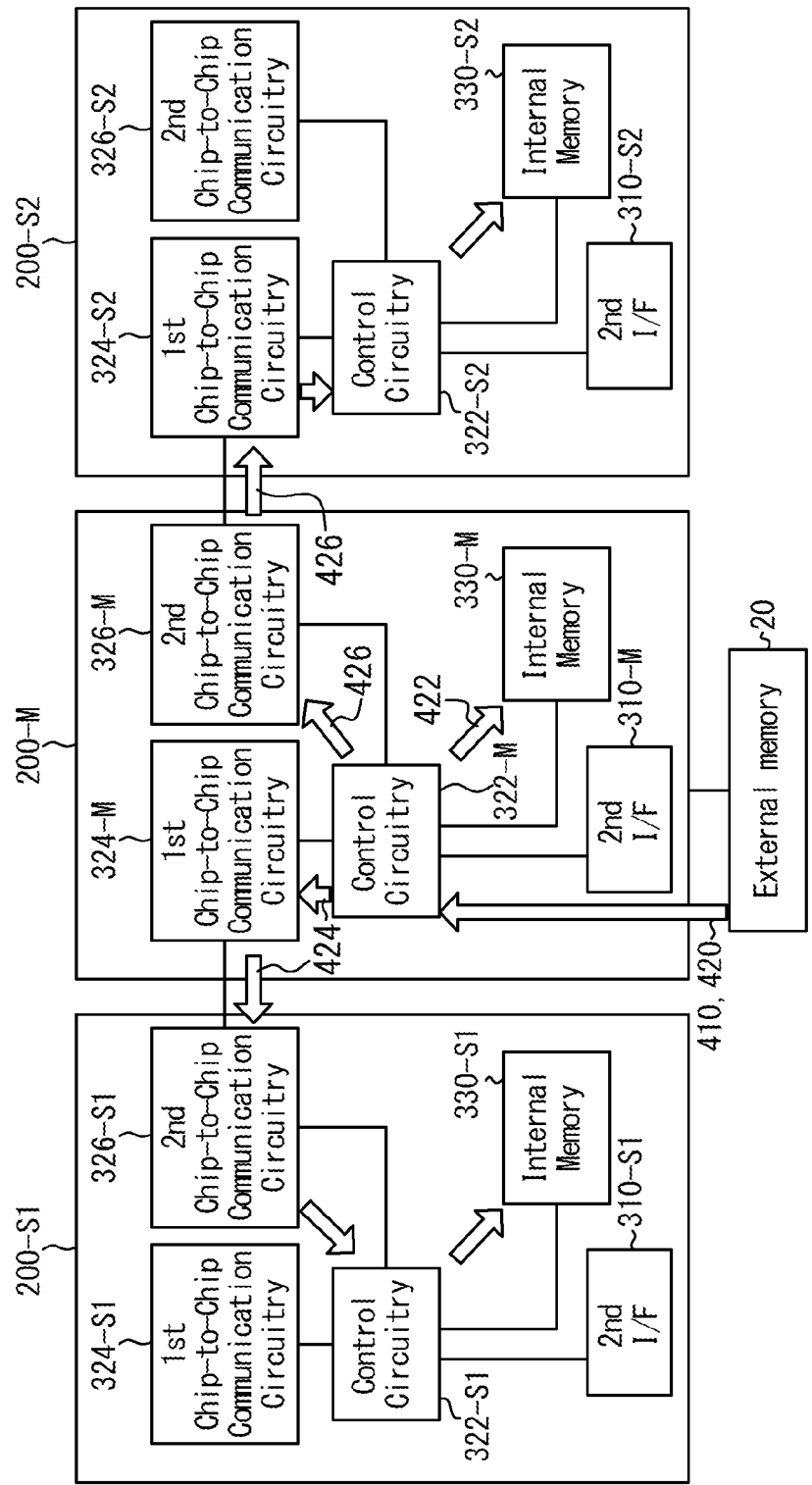
FIG. 7 illustrates an example method of transferring image element data, according to one or more embodiments.

The first chip-to-chip communication circuitry 324 and the second chip-to-chip communication circuitry 326 may be electrically connected to the communication circuitry 320 of a different IC chip 200. For example, as illustrated in FIG. 7, the first chip-to-chip communication circuitry 324-M of the master chip 200-M may be connected to the second chip-to-chip communication circuitry 326-S1 of the first slave chip 200-S1, and the second chip-to-chip communication circuitry 326-M of the master chip 200-M may be connected to the first chip-to-chip communication circuitry 324-S2 of the second slave chip 200-S2. The IC chip 200 connected to the first chip-to-chip communication circuitry 324 may be different from the IC chip 200 connected to the second chip-to-chip communication circuitry 326.

Referring back to FIG. 5, the internal memory 330 is configured to store the image element data transferred from the control circuitry 322 and output the image element data upon request from the image processing circuitry 340, in one or more embodiments. The internal memory 330 comprises, for example, a long horizontal blank (LHB) memory.

The image processing circuitry 340 may comprise overlay circuitry 342, an image intellectual property (IP) core 344, and register circuitry 346. In various embodiments, the overlay circuitry 342 is configured to generate the overlay image 111 to be displayed on the display panel 30 based on the image elements 21, the input image 11, and the overlay control information 12. The overlay circuitry 342 may be configured to receive, from the first interface 300, the overlay control information 12 and partial input image data representing a partial input image that is a part of the input image 11. The overlay circuitry 342 may be further configured to select one or more image elements 21 with which the partial input image is to be overlaid based on the overlay control information 12 and receive the image element data representing the selected image elements 21 from the internal memory 330. In one or more embodiments, the overlay circuitry 342 is further configured to generate, based on the received image element data, an overlay image 111 in which the partial input image is overlaid with the selected image elements 21. The overlay circuitry 342 may be configured to output overlay image data representing the generated overlay image 111 to the image IP core 344. In other embodiments, the overlay circuitry 342 of each IC chip 200 may receive the input image data and extract the partial input image data from the received input image data. In still other embodiments, the first interface 300 of each IC chip 200 may receive partial input image data corresponding to the partial area 35 assigned thereto from the external device 10, and transfer the received partial input image data to the overlay circuitry 342.

In one or more embodiments, the image IP core 344 is configured to generate, based on the overlay image 111, a partial output image to be displayed in the corresponding partial area 35 of the display panel 30. The image IP core 344 may be configured to receive the overlay image data representing the overlay image 111 from the overlay circuitry 342 and generate partial output image data representing a partial output image by performing various types of image processing such as gamma correction on the received overlay image data. The image IP core 344 may be configured to output the partial output image data representing the partial output image to the display panel driver circuitry 350.

The register circuitry 346 may be configured to store various type of setting information of the image processing circuitry 340. In various embodiments, the register circuitry 346 is configured to store the overlay control information 12 received from the external device 10 via the first interface 300 and output the stored overlay control information 12 to the overlay circuitry 342. The register circuitry 346 may store image element control data 510 corresponding to all the image elements 21 based on the overlay control information 12. The overlay control information 12 stored in the register circuitry 346 of each IC chip 200 may be the same.

In one or more embodiments, the display panel driver circuitry 350 is configured to drive the display panel 30 based on the partial output image generated by the image IP core 344. The display panel driver circuitry 350 may be configured to receive the partial output image data from the image IP core 344 and drive the display panel 30 based on the partial output image data. For example, the display panel driver circuitry 350 may be configured to drive pixel circuits 31 in the partial area 35 corresponding to the IC chip 200 in which this display panel driver circuitry 350 is integrated. In one or more embodiments, the partial output image is displayed in each of the partial areas 35 of the display panel 30 through this operation, thereby displaying a complete output image on the display panel 30.

In one or more embodiments, each IC chip 200 comprises a display driver section 360 configured to drive the display panel 30 and a touch detection section 370 configured to detect input to the display panel 30. The display driver section 360 may integrate the first interface 300, the communication circuitry 320, the internal memory 330, the image processing circuitry 340, and the display panel driver circuitry 350. The second interface 310 may be disposed in the touch detection section 370 or the display driver section 360. In other embodiments, each circuitry of the processing system 110 may be disposed in the display driver section 360 or the touch detection section 370.

Figure 6:
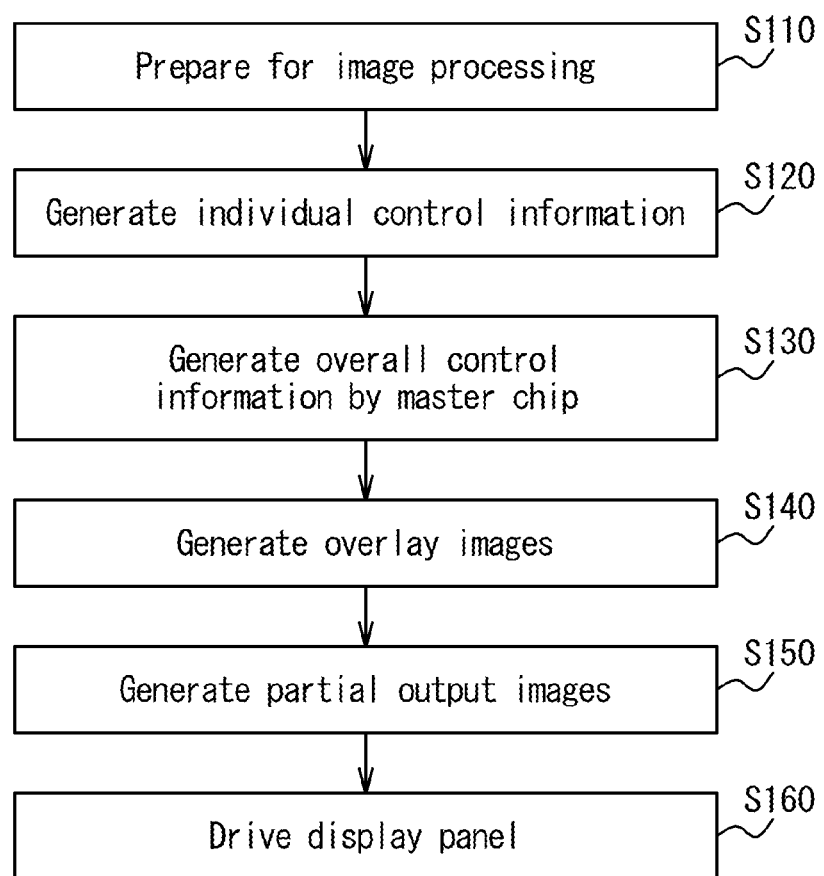
FIG. 6 illustrates an example operation of the processing system, according to one or more embodiments.

FIG. 6 illustrates an example operation of the processing system 110 to drive the display panel 30, according to one or more embodiments. It should be noted that the order of the steps may be altered from the order illustrated. In the embodiment illustrated, the processing system 110 makes a preparation to start image processing in step S110. The preparation may include, for example, preparation for generation of the overlay image 111 from the input image 11 and the image elements 21 based on the overlay control information 12.

Referring to FIG. 7, in one implementation, the master chip 200-M receives the image element data 420 from the external memory 20 and transfers, to other IC chips 200, the received image element data 420 associated with to the other IC chips 200. For example, the master chip 200-M transfers the first slave chip image element data 424 included in the received image element data 420 to the first slave chip 200-S1 and transfers the second slave chip image element data 426 to the second slave chip 200-S2.

The control circuitry 322-M of the master chip 200-M may determine, based on the index data 410 stored in the external memory 20, a total data size by adding up the data sizes of the image element data corresponding to the IC chips 200. The control circuitry 322-M may acquire the index data 410 from the external memory 20 and extract the data size of the image element data associated with each of the IC chips 200 from the index data 410. The control circuitry 322-M may determine, based on the extracted data sizes, the total data size of the image element data associated with each IC chip 200.

The control circuitry 322-M of the master chip 200-M may further acquire the master chip image element data 422 from the external memory 20 and transfer the master chip image element data 422 to the internal memory 330-M. The acquisition of the master chip image element data 422 from the external memory 20 may be based on the total data size of the image element data corresponding to the master chip 200-M, that is, based on the data size of the master chip image element data 422. In one or more embodiments, the internal memory 330-M stores the master chip image element data 422 received from the external memory 20. The control circuitry 322-M may transfer the master chip index data 412 to the internal memory 330-M.

In one or more embodiments, the control circuitry 322-M further acquires the first slave chip image element data 424 from the external memory 20 and outputs the first slave chip image element data 424 to the first slave chip 200-S1. The control circuitry 322-M may acquire the first slave chip image element data 424 from the external memory 20 based on the total data size of image element data corresponding to the first slave chip 200-S1, that is, based on the data size of the first slave chip image element data 424. The control circuitry 322-M may transfer the first slave chip image element data 424 to the control circuitry 322-S1 of the first slave chip 200-S1 via the first chip-to-chip communication circuitry 324-M of the master chip 200-M and the second chip-to-chip communication circuitry 326-S1 of the first slave chip 200-S1. In one or more embodiments, the control circuitry 322-S1 of the first slave chip 200-S1 transfers the first slave chip image element data 424 to the internal memory 330-S1, and the internal memory 330-S1 stores the first slave chip image element data 424.

The control circuitry 322-M of the master chip 200-M may transfer the first slave chip index data 414 to the control circuitry 322-S1 of the first slave chip 200-S1. In such embodiments, the control circuitry 322-S1 may transfer the first slave chip index data 414 to the internal memory 330-S1, and the internal memory 330-S1 may store the first slave chip index data 414.

In one or more embodiments, the control circuitry 322-M further acquires the second slave chip image element data 426 from the external memory 20 and outputs the second slave chip image element data 426 to the second slave chip 200-S2. The control circuitry 322-M may acquire the second slave chip image element data 426 from the external memory 20 based on the total data size of image element data corresponding to the second slave chip 200-S2, that is, based on the data size of the second slave chip image element data 426. The control circuitry 322-M may transfer the second slave chip image element data 426 to the control circuitry 322-S2 of the second slave chip 200-S2 via the second chip-to-chip communication circuitry 326-M of the master chip 200-M and the first chip-to-chip communication circuitry 324-S2 of the second slave chip 200-S2. In one or more embodiments, the control circuitry 322-S2 of the second slave chip 200-S2 transfers the second slave chip image element data 426 to the internal memory 330-S2, and the internal memory 330-S2 stores the second slave chip image element data 426.

The control circuitry 322-M of the master chip 200-M may additionally transfer the second slave chip index data 416 to the control circuitry 322-S2 of the second slave chip 200-S2. In such embodiments, the control circuitry 322-S2 may transfer the second slave chip index data 416 to the internal memory 330-S2, and the internal memory 330-S2 may store the second slave chip index data 416.

In one or more embodiments, in step S120 illustrated in FIG. 6, each of the IC chips 200 generates individual control information that indicates completion of preparation to start the image processing in each IC chip 200.

Figure 8:
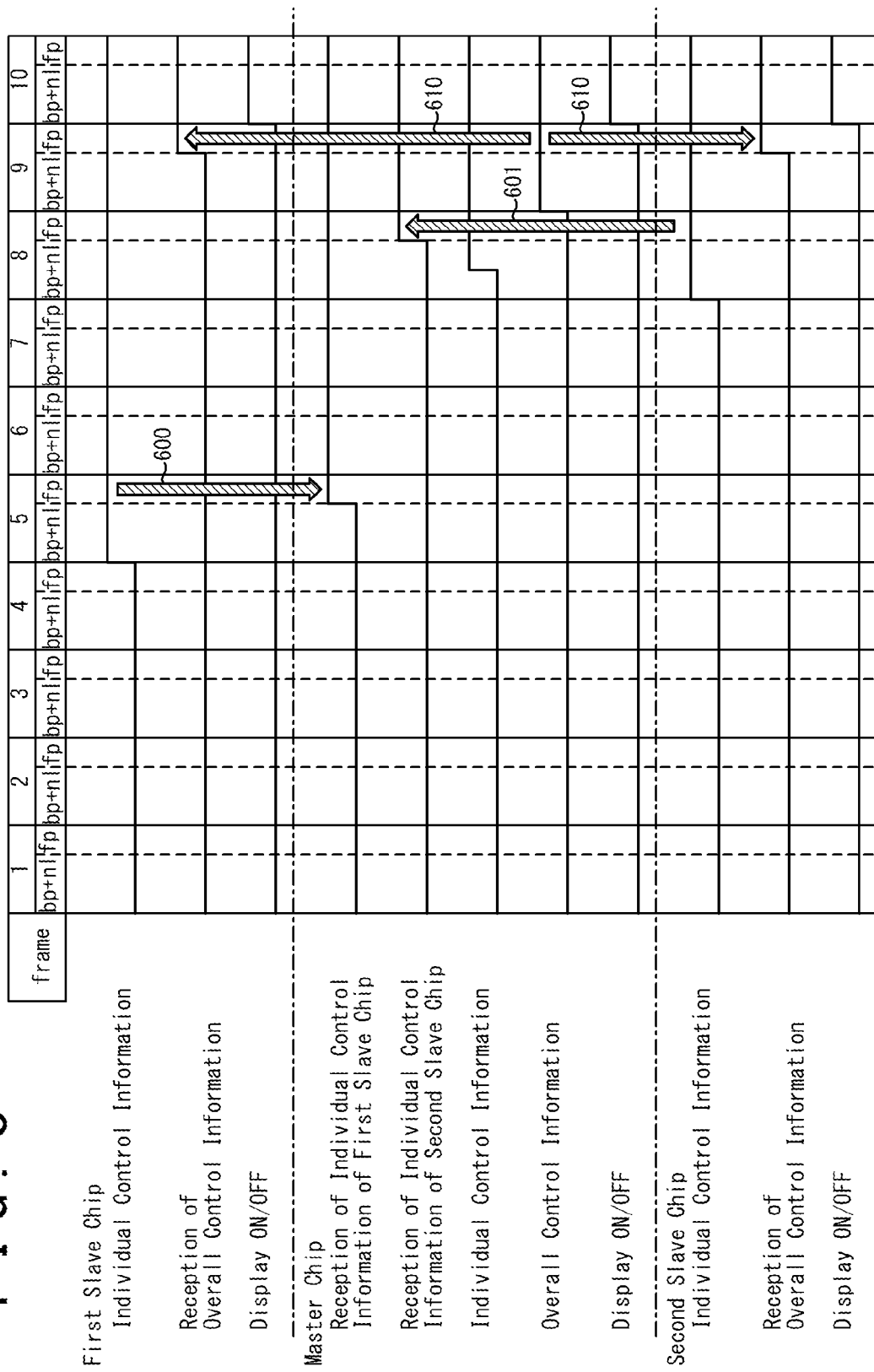
FIG. 8 illustrates an example transmission of individual control information and overall control information, according to one or more embodiments.

FIG. 8 illustrates example operations of the respective IC chips 200 in which the individual control information is generated. In FIG. 8, "bp+nl" indicates a back porch period and a display update period in each frame; "fp" indicates a front porch period; and the numbers "1" through "10" are frame numbers. In the embodiment illustrated, the control circuitry 322 of each of the IC chips 200 determines, based on completion of the storage of the image element data in the internal memory 330, that preparation for generation of the overlay image 111 by the overlay circuitry 342 is completed. The control circuitry 322 of each of the IC chips 200 may determine that the preparation for generation of the overlay image 111 by the overlay circuitry 342 is completed when the storage of the image element data in the internal memory 330 is completed. In the embodiment illustrated in FIG. 8, the control circuitry 322-S1 of the first slave chip 200-S1 completes preparation for image processing in frame 5 and sends the individual control information to the control circuitry 322-M of the master chip 200-M as indicated by arrow 600. Further, the control circuitry 322-S2 of the second slave chip 200-S2 completes preparation for image processing in frame 8 and sends the individual control information to the control circuitry 322-M of the master chip 200-M as indicated by arrow 601. The control circuitry 322-M of the master chip 200-M completes preparation for image processing in frame 8 and generates the individual control information. The individual control information may be sent, for example, in a front porch period.

Referring back to FIG. 6, in step S130, the master chip 200-M may generate overall control information using individual control information generated by each IC chip 200 and then send the overall control information to other IC chips 200. In the embodiment illustrated in FIG. 8, the control circuitry 322-M of the master chip 200-M receives the individual control information from the first slave chip 200-S1 in frame 5 and receives the individual control information from the second slave chip 200-S2 in frame 8. The master chip 200-M completes preparation for image processing in frame 8 and generates its individual control information. The master chip 200-M then generates and sends the overall control information represented by arrow 610 to the first slave chip 200-S1 and the second slave chip 200-S2 in frame 9. The overall control information may be sent, for example, in a front porch period.

In step S140 of FIG. 6, the IC chips 200 may perform image processing using the overall control information from the master chip 200-M. For example, the control circuitry 322 of each IC chip 200 may send a start instruction to the image processing circuitry 340 to start generating a partial output image. In one embodiment, as illustrated in FIG. 8, the start instruction may be sent during a front porch period.

In one or more embodiments, in step S140 of FIG. 6, the overlay circuitry 342 in each IC chip 200 starts the image processing based on the start instruction. The image processing may include generation of the overlay image 111 from the input image 11 and the image elements 21 based on the overlay control information 12. When the status value of the first image element control data 510-1 included in the overlay control information 12 is, for example, "1", the corresponding part of the overlay image 111 is generated by overlaying the partial input image with the first image element. When the status value of the first image element control data 510-1 is "0", the overlay circuitry 342 generates the portion of the overlay image 111 without overlaying the partial input image with the first image element. The status values "0" and "1" of the first image element control data 510-1 are merely examples, and arbitrary values may be used instead. The overlay circuitry 342 may further extract from the index data 410, the location at which the partial input image is to be overlaid with the first image element.

In one or more embodiments, the overlay circuitry 342 selectively acquires from the register circuitry 346 only image element control data 510 corresponding to one or more image elements 21 to be displayed in the corresponding partial area 35. For example, when a second image element corresponding to second image element control data 510-2 is not to be displayed in the corresponding partial area 35, the overlay circuitry 342 generates the corresponding part of the overlay image 111 without acquiring the second image element control data 510-2.

In one or more embodiments, after the overlay image 111 is generated, the image IP core 344 of each IC chip 200 generates a partial output image for driving the display panel 30 in step S150 by performing image processing on the overlay image 111. The image IP core 344 may output partial output image data representing the partial output image to the display panel driver circuitry 350.

In one or more embodiments, in step S160, the display panel driver circuitry 350 of each IC chip 200 drives the display panel 30 based on the partial output image. In various embodiments, the display panel 30 displays the partial output images on the partial areas 35, thereby displaying a complete output image in which the input image 11 is overlaid with desired one or more of the image elements 21.

Figure 9:
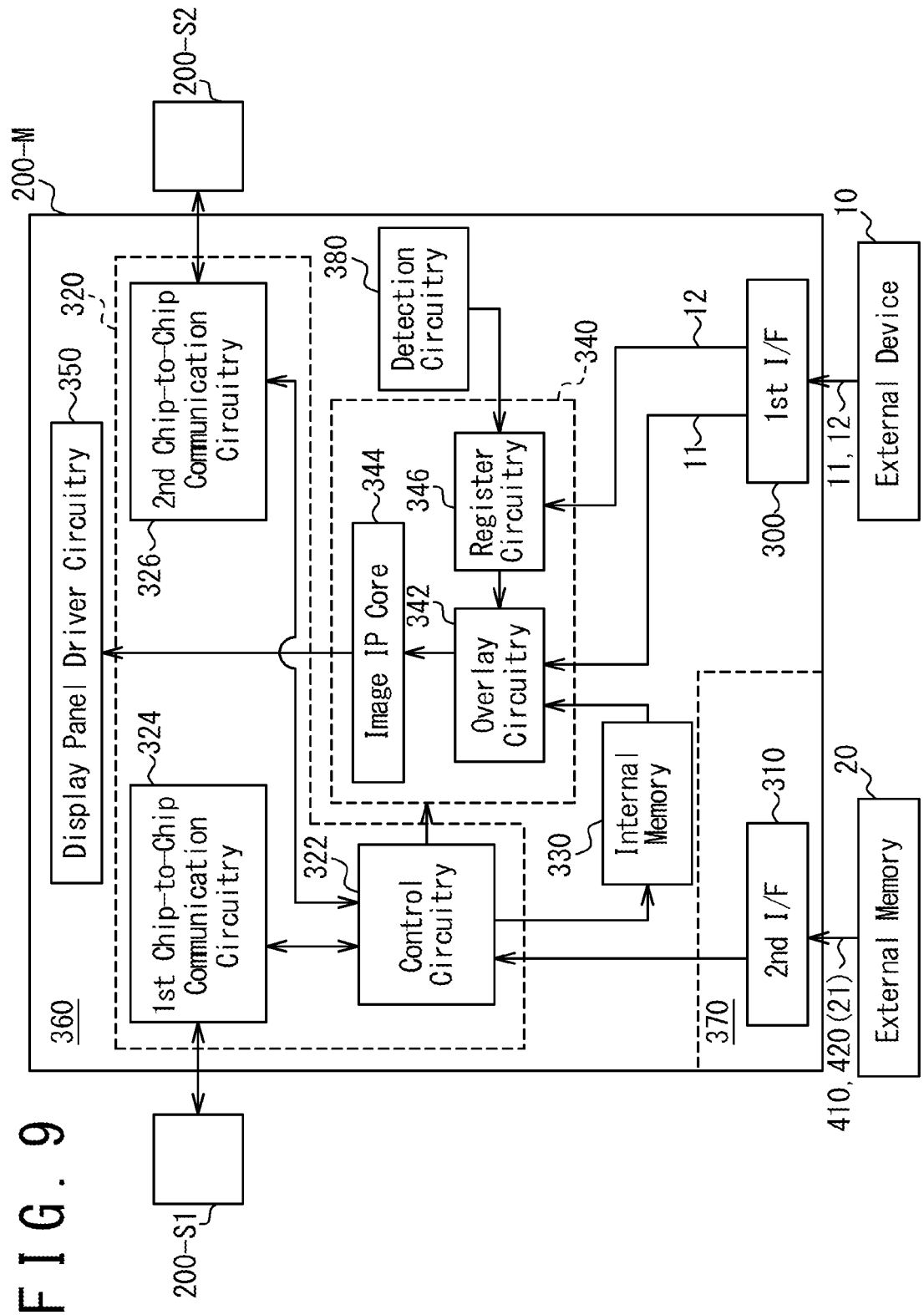
FIG. 9 illustrates an example configuration of a processing system, according to one or more embodiments.

In embodiments where the processing system 110 is configured to detect an abnormality in the communications with the external devices 10, the processing system 110 may be configured to generate an overlay image 111 in which an abnormal image, such as a solid black image, is overlaid with an image element 21 indicating abnormality detection (this image element 21 may be hereinafter referred to as "abnormality-indicating image element"). The abnormality in the communications may result from noise applied to communication lines, desynchronization between the external device 10 and the processing system 110, or other causes. FIG. 9 illustrates an example configuration of the processing system 110 adapted to the abnormality detection. Each IC chip 200 may comprise detection circuitry 380 configured to detect an abnormality in the communications between the external device 10 and the IC chip 200. The detection circuitry 380 may be configured to output abnormality detection information to the register circuitry 346 when the detection circuitry 380 detects the abnormality in the communications with the external device 10. The abnormality detection information may include information that indicates an abnormality is detected and/or and information that indicates type of abnormality. The register circuitry 346 may be configured to store the abnormality detection information as part of the image element control data 510.

The overlay circuitry 342 may be configured to receive the abnormal image and abnormality-indicating image element data representing the abnormality-indicating image element and generate an overlay image 111 in which the abnormal image is overlaid with the abnormality-indicating image element. The abnormal image may be stored in the internal memory 330. In other embodiments, circuitry integrated in each IC chip 200 such as the first interface 300 or the image processing circuitry 340 may be configured to generate the abnormal image. Like other image element data, the abnormality-indicating image element data may be transferred from the external memory 20 to the internal memory 330 at startup of the IC chips 200. The overlay circuitry 342 may be configured to receive the image element control data 510 that indicates the abnormality detection from the register circuitry 346 and acquire the abnormality-indicating image element data from the internal memory 330 based on the received image element control data 510. The overlay circuitry 342 may be configured to generate the overlay image 111 in which the abnormal image is overlaid with the abnormality-indicating image element.

In such embodiments, the image IP core 344 may be configured to generate the partial output image based on the overlay image 111 and output partial output image data representing the generated partial output image, to the display panel driver circuitry 350, and the display panel driver circuitry 350 may be configured to drive the display panel 30 based on the partial output image data thus generated. This results in that the display panel 30 displays an image indicating that the abnormality is detected.

In one or more embodiments, the image indicating detection of the abnormality may be displayed on the display panel 30 based on the detection of the abnormality by the IC chips 200 as described above. The detection circuitry 380 may be configured to detect any type of abnormality. For example, the detection circuitry 380 may be configured to detect a malfunction of circuitry integrated in the IC chip 200. In such embodiments, the detection circuitry 380 may be configured to output abnormality detection information corresponding to the type of detected abnormality and the external memory 20 may be configured to store abnormality-indicating image element data for each type of abnormality. This may allow the processing system 110 to display the type of the abnormality on the display panel 30 based on the abnormality-indicating image element data corresponding to the detected abnormality stored in the external memory 20.

In one or more embodiments, the detection circuitry 380 may be configured to output the abnormality detection information to the register circuitry 346 integrated in a different IC chip 200. In such embodiments, the abnormality detection information may be sent to the different IC chip 200 from the first chip-to-chip communication circuitry 324 or from the second chip-to-chip communication circuitry 326 of the communication circuitry 320. This allows the processing system 110 to display, based on detection of abnormality by one of the IC chips 200, an image indicating the abnormality in the partial area 35 corresponding to a different IC chip 200.

Figure 10:
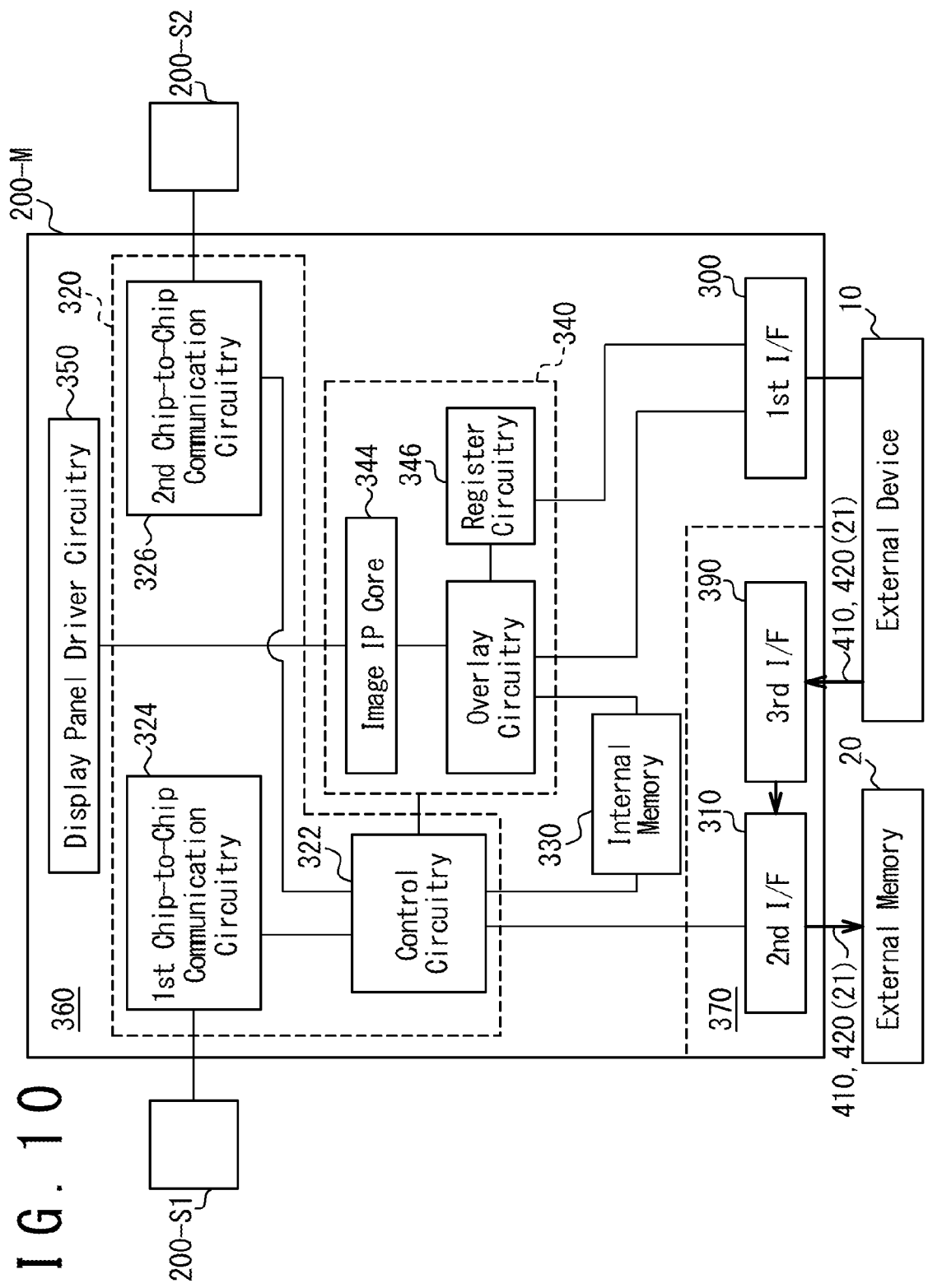
FIG. 10 illustrates an example configuration of a processing system, according to one or more embodiments.

FIG. 10 illustrates an example configuration of the processing system 110 according to other embodiments. In the embodiment illustrated, at least one IC chip 200 may comprise a third interface 390 electrically connected to the second interface 310. The third interface 390 may be configured to receive the index data 410 and the image element data 420 illustrated in FIG. 3 and transfer the received index data 410 and image element data 420 to the external memory 20 via the second interface 310. The third interface 390 may comprise, for example, an SPI, an I2C interface, and the like. This may facilitate storing the image element data into the external memory 20. The third interface 390 may be disposed in the touch detection section 370 or the display driver section 360.

Figure 11:
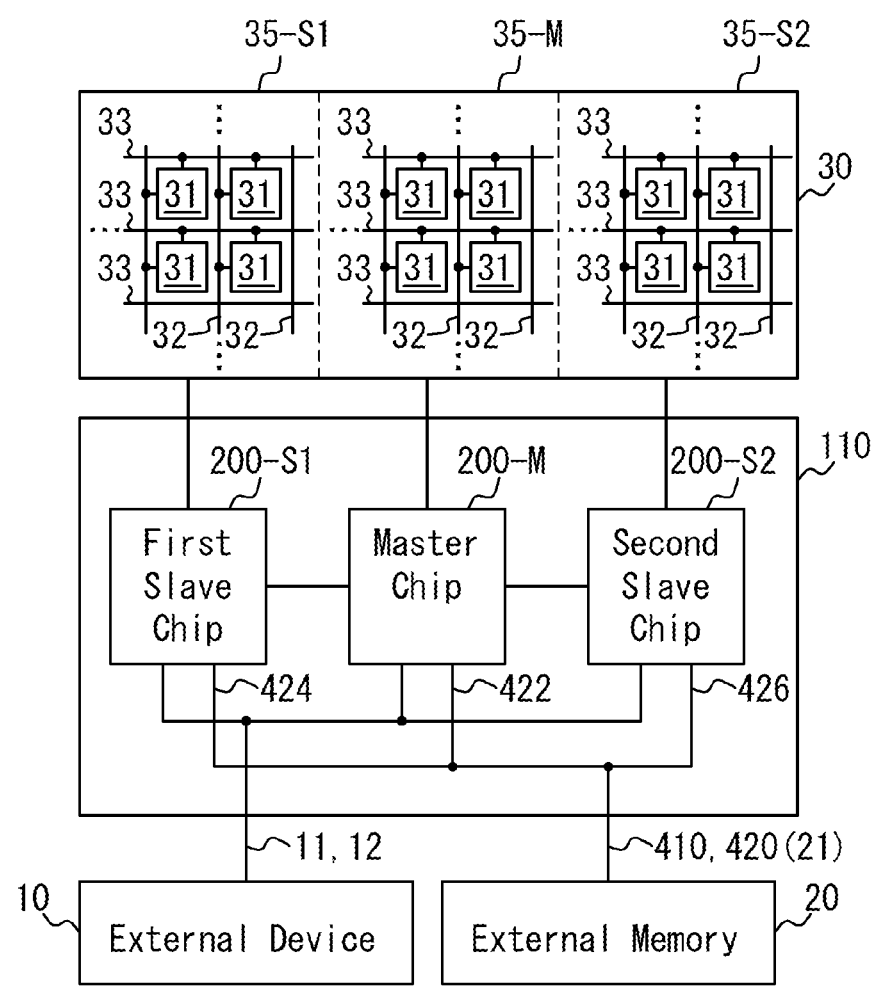
FIG. 11 illustrates an example configuration of a display device, according to one or more embodiments.

FIG. 11 illustrates an example configuration of the display system, according to other embodiments. In the embodiment illustrated, each IC chip 200 is configured to directly receive the image element data representing the image elements 21 from the external memory 20. In such embodiments, the external memory 20 may be connected to the second interface 310 of each IC chip 200. The external memory 20 may be configured to output all the image element data to each IC chip 200 or output to each IC chip 200 image element data representing one or more image elements 21 to be displayed in the partial area 35 assigned to the IC chip 200.

For example, the control circuitry 322-M of the master chip 200-M may be configured to receive master chip image element data 422 representing one or more image elements 21 to be displayed on the partial area 35-M corresponding to the master chip 200-M from the external memory 20 via the second interface 310-M and store the received master chip image element data 422 in the internal memory 330-M. The control circuitry 322-S1 of the first slave chip 200-S1 may be configured to receive first slave chip image element data 424 representing one or more image element 21 to be displayed on the partial area 35-S1 corresponding to the first slave chip 200-S1 from the external memory 20 via the second interface 310-S1 and store the received first slave chip image element data 424 in the internal memory 330-S1. The control circuitry 322-S2 of the second slave chip 200-S2 may be configured to receive second slave chip image element data 426 representing one or more image elements 21 to be displayed on the partial area 35-S2 corresponding to the second slave chip 200-S2 from the external memory 20 via the second interface 310-S2 and store the received second slave chip image element data 426 in the internal memory 330-S2.

In other embodiments, the control circuitry 322 of each IC chip 200 may be configured to receive the image element data 420 representing all the image elements 21 from the external memory 20. The control circuitry 322 may be configured to store in the internal memory 330 image element data representing one or more image elements 21 to be displayed on the corresponding partial area 35.

In one or more embodiments, each IC chip 200 is configured to switch operation modes by a predetermined setting. For example, an IC chip 200 may operate as the master chip 200-M in a first operation mode. The IC chip 200 may operate as the first slave chip 200-S1 in a second operation mode. The IC chip 200 may operate as the second slave chip 200-S2 in a third operation mode. The IC chip 200 may operate in one of the first to third operation modes depending on the setting. The setting of the IC chip 200 may be determined in the assembly process of the display system that incorporates the IC chip 200 depending on the partial area that corresponds to the IC chip 200.

The following are also embodiments of this disclosure.

A processing system is provided in one or more embodiments. The processing system comprises a first IC chip and a second IC chip. The first IC chip comprises: first image processing circuitry configured to generate a first partial output image through first image processing; first display panel driver circuitry configured to drive a display panel based on the first partial output image; and first communication circuitry. The second IC chip comprises: second image processing circuitry configured to generate a second partial output image through second image processing; second display panel driver circuitry configured to drive the display panel based on the second partial output image; and second communication circuitry configured to generate individual control information based on completion of preparation to start the second image processing. The first communication circuitry is configured to generate overall control information based on reception of the individual control information from the second communication circuitry and completion of preparation to start the first image processing. The first image processing circuitry is further configured to start the first image processing based on the overall control information. The second image processing circuitry is further configured to start the second image processing based on the overall control information.

The first image processing may generate as the first partial output image a first overlay image in which a first partial input image is overlaid with a first image element.

The second image processing may generate as the second partial output image a second overlay image in which a second partial input image is overlaid with a second image element.

An IC chip is provided in one or more embodiments. The IC chip comprises: image processing circuitry configured to generate a partial output image through first image processing; display panel driver circuitry configured to drive a display panel based on the partial output image; and communication circuitry configured to generate overall control information based on reception of first individual control information and completion of preparation for the first image processing by the image processing circuitry, the first individual control information being generated based on completion of preparation for second image processing in a different IC chip. The image processing circuitry is further configured to start the first image processing based on the overall control information.

Generating the overall control information may comprise generating the overall control information based on the reception of the first individual control information and the completion of the preparation for the first image processing in a first operation mode. The communication circuitry may be further configured to generate second individual control information based on the completion of preparation for the first image processing in the image processing circuitry and output the second individual control information to a different IC chip in a second operation mode.

The communication circuitry may be configured to output the overall control information to the different IC chip.

The first image processing generates as the partial output image an overlay image in which a partial input image is overlaid with an image element.

A method for driving a display panel is also provided. In one or more embodiments, the method comprises: sending individual control information to a first IC chip based on completion of preparation to start second image processing in a second IC chip; by the first IC chip, generating overall control information based on reception of the individual control information from the second IC chip and completion of preparation to start first image processing in the first IC chip; by the second IC chip, starting the second image processing based on the overall control information; by the first IC chip, starting the first image processing based on the overall control information; and driving a display panel based on a first partial output image generated through the first image processing and a second partial output image generated through the second image processing.

The first image processing may generate as the first partial output image a first overlay image in which a first partial input image is overlaid with a first image element. The second image processing may generate as the second partial output image a second overlay image in which a second partial input image is overlaid with a second image element.

Although various embodiments of the present disclosure are concretely described above, various modified examples of the present disclosure can be achieved by changing the techniques described in the specification.

What is claimed is:

1. A processing system, comprising:
   a first integrated circuit (IC); and
   a second IC,
   wherein the first IC comprises:
      a first interface configured to receive first image element data and second image element data; and
      first communication circuitry configured to transfer the first image element data to first image processing circuitry and the second image element data to the second IC,
   wherein the first image processing circuitry is configured to prepare a first overlay image comprising a first partial input image overlaid with a first image element based on the first image element data and overlay control information,
   wherein the first IC is configured to receive individual control information from the second IC indicating completion of preparation of a second overlay image, wherein completion of the preparation corresponds to storage of the second image element data, and
   wherein the first IC is configured to generate overall control information based on the individual control information and, in response, generate the first overlay image.

2. The processing system of claim 1, wherein the overlay control information identifies the first image element and indicates the first image element is to be displayed.

3. The processing system of claim 2, wherein the overlay control information identifies a second image element corresponding to the second image element data and indicates the second image element is not to be displayed.

4. The processing system of claim 1, further comprising first display panel driver circuitry configured to drive a display panel based on the first overlay image.

5. The processing system of claim 1, wherein the first IC further comprises detection circuitry configured to detect an abnormality,
   wherein the first image processing circuitry is further configured to generate, based on detection of the abnormality, an abnormality-indicating image element indicative of the abnormality.

6. The processing system of claim 1, wherein the second IC comprises:
   second communication circuitry configured to receive the second image element data from the first IC; and
   second image processing circuitry configured to generate the second overlay image.

7. The processing system of claim 6, wherein the second IC further comprises a second interface configured to receive second partial input image data and the overlay control information, and
   wherein the second image processing circuitry is further configured to:
   receive the second partial input image data representing the second partial input image and the overlay control information from the second interface; and
   generate the second overlay image based on the overlay control information and overall control information.

8. The processing system of claim 7,
   wherein the first communication circuitry is further configured to generate the overall control information based on preparation of the first image processing circuitry to generate the first overlay image, and wherein the second image processing circuitry is configured to generate the second overlay image using the overall control information.

9. The processing system of claim 8, wherein the first IC further comprises an internal memory, and the first communication circuitry further configured to:
store the first image element data in the internal memory; and
determine that the first image processing circuitry is prepared to generate the first overlay image in response to completion of storing the first image element data into the internal memory.

10. The processing system of claim 6, wherein the first IC further comprises detection circuitry configured to detect an abnormality and generate abnormality detection information based on detection of the abnormality,
wherein the second image processing circuitry is further configured to generate, based on the abnormality detection information, a third overlay image including an abnormality-indicating image element indicative of the abnormality.

11. A first integrated circuit (IC), comprising:
a first interface configured to receive first image element data and second image element data; and
first communication circuitry configured to transfer the first image element data to first image processing circuitry and the second image element data to a second IC,
wherein the first image processing circuitry is configured to prepare a first overlay image comprising a first partial input image overlaid with a first image element based on the first image element data and overlay control information;
wherein the first IC is configured to receive individual control information from the second IC indicating completion of preparation of a second overlay image, wherein completion of the preparation corresponds to storage of the second image element data, and
wherein the first IC is configured to generate overall control information based on the individual control information and, in response, generate the first overlay image.

12. The first IC of claim 11, wherein the overlay control information identifies the first image element and indicates the first image element is to be displayed.

13. The first IC of claim 12, wherein the overlay control information identifies a second image element corresponding to the second image element data and indicates the second image element is not to be displayed.

14. The first IC of claim 11, further comprising first display panel driver circuitry configured to drive a display panel based on the first overlay image.

15. The first IC of claim 11, wherein the first IC further comprises detection circuitry configured to detect an abnormality,
wherein the first image processing circuitry is further configured to generate, based on detection of the abnormality, an abnormality indicating image element indicative of the abnormality.

16. A method, comprising:
receiving, by a first integrated circuit (IC), first image element data, second image element data, and control information, wherein the first image element data represents a first image element;
preparing, by the first IC, a first overlay image comprising a first partial input image overlaid with the first image element based on the control information;
outputting, by the first IC to a second IC, the second image element data representing a second image element; and
preparing, by the second IC, a second overlay image comprising a second partial input image overlaid with the second image element based on the control information;
receiving, by the first IC, individual control information from the second IC indicating completion of preparation of the second overlay image, wherein completion of the preparation corresponds to storage of the second image element data, and
wherein the first IC is configured to generate overall control information based on the individual control information and, in response, generate the first overlay image.

17. The method of claim 16, wherein the control information identifies the first image element and indicates the first image element is to be displayed.

18. The method of claim 16, further comprising:
driving, by the first IC, a display panel using the first overlay image; and
driving, by the second IC, the display panel using the second overlay image.

19. The method of claim 16, further comprising:
generating, by the first IC, the overall control information based on completion of preparation to generate of the first overlay image, and
generating, by the second IC, the second overlay image based on the overall control information.

20. The method of claim 19, further comprising storing first image element data representing the first image element in a first internal memory of the first IC,
wherein generating the overall control information comprises determining the completion of the preparation to generate the first overlay image based on storing the first image element data in the first internal memory.

* * * * *